Feb. 16, 1937.  G. T. K. WOODLEY  2,070,851
WOOD SCREW
Filed Oct. 4, 1935

Inventor
G. T. K. WOODLEY
By J. E. M. Fetherstonhaugh
Atty.

Patented Feb. 16, 1937

2,070,851

UNITED STATES PATENT OFFICE 2,070,851

WOOD SCREW

Gordon T. K. Woodley, Waterford, Ontario, Canada

Application October 4, 1935, Serial No. 43,578

3 Claims. (Cl. 85—41)

My invention relates to improvements in wood screws and an object of the invention is to devise means on the shank of the screw whereby retrograde rotation thereof in the wood or other material into which it is screwed is prevented.

A further object is to so construct the above means that it will not appreciably hamper the screwing in of the screw into the wood.

A still further object is to so position the aforesaid means on the shank that it will preferably be disposed within and below the maximum cross-sectional circumference of such shank thereby causing the following portion of the shank as the screw is screwed into the wood, due to its taper, to press out any groove in the wall of the screw receiving orifice that may be scribed thereon by the aforesaid means.

Yet another object is to devise means for the purpose above described which will entail only an incidental additional operation in the manufacture of the screw and thus will not increase its cost of manufacture to any appreciable extent.

With the above and other objects in view which will hereinafter appear as the specification proceeds, my invention consists of the construction and arrangement all as hereinafter more particularly described and illustrated in the accompanying drawing in which:—

Like characters of reference indicate corresponding parts in the different views.

Figure 1:
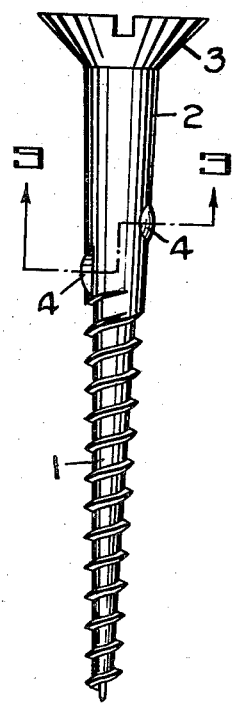
Fig. 1 represents a side view of a typical wood screw showing my means for preventing retrograde rotation thereof applied to the unthreaded portion of its tapered shank.
Figure 2:
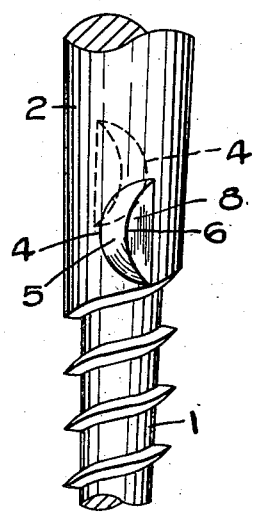
Fig. 2 is an enlarged fragmentary elevation of a portion of the screw illustrated in Fig. 1, showing my means on the unthreaded shank portion thereof, said view being taken at right angles to Fig. 1.
Figure 3:
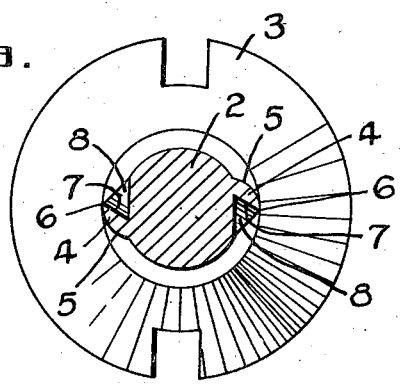
Fig. 3 is an enlarged sectional view of the screw taken on the line 3—3 (Fig. 1).

In the drawing, 1 represents the threaded tapered portion of the shank and 2 the unthreaded tapered shank portion thereof, which latter is surrounded by the usual inverted truncated conical cross-slotted head 3.

Immediately adjacent to the upper end of the threaded portion 1 of the shank I form a generally laterally and outwardly extending lug 4 on the outer surface of the unthreaded portion 2 of the shank and preferably substantially diametrically opposite to and somewhat above it I form a second lug 4 also extending laterally outwardly from the surface of the unthreaded portion 2 of the shank. While I may constitute the lugs 4 horizontally diametrically opposite to each other I prefer to form one lug above the other lug substantially a distance equal to the pitch of the screw thread.

In forming the lugs 4 I preferably keep their outer extremities within the maximum cross-sectional circumference of the unthreaded portion 2 of the shank which is disposed at the top thereof.

Each lug 4 is preferably of crescent shape disposed substantially vertically on the shank portion 2 and having its outer wall 5 merging from the lug extremity 6 which is preferably crescent shaped into the outer surface of the shank portion 2, thus constituting a tapered outer wall which is directed in the direction of rotation of the screw in screwing it into the wood or other material. The inner wall 7 of each lug is undercut, thus constituting a recess or indenture 8 in the surface of the shank portion 2 underlying the lug.

In screwing the screw into the wood or other material the tapered outer wall is the leading portion of the lug and the extremity 6 is the trailing portion. When the screw has a tendency to rotate in a retrograde direction, in other words to unscrew, the extremity 6 becomes the leading portion and the outer wall 5 the trailing portion.

In manufacturing a screw provided with my lugs for preventing retrograde rotation thereof it is merely necessary to apply dies or tools of the required form very nearly tangentially to the surface of the unthreaded portion 2 of the shank and force them inwardly therein, with the result that the material of the shank is formed into outwardly extending lugs and corresponding cup-shaped indentures are constituted underlying the same.

I will now more particularly describe the result attained by the use of the lugs as described above. When the screw is screwed into the wood or other material the tapered outer walls 5 of the lugs slip on the wall of the orifice in the wood without appreciably fracturing its fibres and consequently the driving of the screw is not substantially hampered. If there is any tendency for the lugs to scribe a groove in the wall of the orifice this is removed by the following tapered portion 2 of the shank compressing the fibres as the screw is driven home, as the outer extremities of the lugs are disposed within the maximum cross-sectional circumference of the shank.

When the screw, due to any cause, has a tendency to rotate in a retrograde direction, i. e. unscrew, the sharp extremities 6 of the lugs penetrate into the material of the orifice into which the screw is driven, and crowd such material into the underlying indentures 8, effectively preventing the screw from turning.

Thus the screw is anchored in the material against accidental retrograde rotation. It is, of course, obvious that if it is desired to remove the screw by the use of a screw-driver it is still possible to unscrew the screw but this will require considerable effort as it will be necessary to exert sufficient force to cause the lugs to cut a groove in the wall of the orifice.

Although I have illustrated two lugs it is apparent that I may employ any number of lugs arranged around the circumference of the unthreaded portion of the shank, depending upon the size of the screw, or in the case of small screws I may employ a single lug.

What I claim as my invention is:

1. In a wood screw having a threaded and an unthreaded tapered portion constituting its shank, the combination with the unthreaded tapered shank portion, of a vertically directed lug extending laterally outwardly from the surface of the unthreaded shank portion and having an outer wall tapering from its free extremity to the junction with the surface of the unthreaded shank portion in the direction of rotation of the screw in driving it into the wood, the free extremity of the lug being disposed within the maximum cross-sectional circumference of the unthreaded tapered shank portion.

2. In a wood screw having a threaded and an unthreaded tapered portion constituting a shank, the combination with the unthreaded tapered shank portion, of a vertically directed lug extending laterally outwardly from the surface of the unthreaded shank portion and having an outer wall tapering from its free extremity to the junction with the surface of the unthreaded shank portion in the direction of rotation of the screw in driving it into the wood, and a second vertically directed lug extending laterally outwardly from the surface of the unthreaded shank portion and disposed thereon in spaced relation to the first mentioned lug, said second lug having an outer wall tapering from its free extremity to the juncture with the surface of the unthreaded shank portion in the direction of rotation of the screw in driving it into the wood, the free extremity of each lug being disposed within the maximum cross-sectional circumference of the unthreaded tapered shank portion.

3. A wood screw comprising, in combination, a head, a tapered shank depending from the head and having an unthreaded upper portion and a threaded lower portion, a vertically directed laterally outwardly extending lug formed on the unthreaded portion of the shank in the vicinity of the upper end of the threaded shank portion, said lug having an outer wall tapering from its free extremity to the junction with the unthreaded portion of the shank in the direction of rotation of the screw in driving it into the wood, and a second vertically directed laterally outwardly extending lug formed on the unthreaded portion of the shank substantially diametrically opposite to and above the first mentioned lug, said second lug having an outer wall tapering from its free extremity to the junction with the unthreaded portion of the shank in the direction of rotation of the screw in driving it into the wood, the free extremities of the lugs being disposed within the maximum cross-sectional circumference of the tapered shank and an indenture being formed in the surface of the shank underlying each lug.

GORDON T. K. WOODLEY.